United States Patent

Kröck et al.

[11] 4,278,434
[45] Jul. 14, 1981

[54] TRANSFER PRINTING PROCESS AND PRINTING INKS AND TEMPORARY SUPPORTS FOR CARRYING OUT THIS PROCESS

[75] Inventors: Friedrich W. Kröck, Cologne; Rütger Neeff, Leverkusen; Robert Kuth, Cologne, all of Fed. Rep. of Germany

[73] Assignee: Bayer Aktiengesellschaft, Leverkusen, Fed. Rep. of Germany

[21] Appl. No.: 120,190

[22] Filed: Feb. 11, 1980

[30] Foreign Application Priority Data

Feb. 28, 1979 [DE] Fed. Rep. of Germany ....... 2907724

[51] Int. Cl.³ .............................................. B41M 5/26
[52] U.S. Cl. .......................................... 8/471; 8/678; 8/922; 106/22
[58] Field of Search ....................... 8/471, 678; 106/22

[56] References Cited

U.S. PATENT DOCUMENTS

| 2,937,190 | 5/1960 | Straley et al. ..................... 260/347.4 |
| 2,967,871 | 1/1961 | Straley et al. ..................... 260/463 |
| 3,707,346 | 12/1972 | Markert et al. ..................... 8/471 |

FOREIGN PATENT DOCUMENTS 538014 11/1931 Fed. Rep. of Germany .
2431026 1/1976 Fed. Rep. of Germany .

OTHER PUBLICATIONS

Venkataraman's "The Chemistry of Synthetic Dyes", vol. VIII (Academic Press, 1978), p. 192.

Primary Examiner—A. Lionel Clingman
Attorney, Agent, or Firm—Sprung, Felfe, Horn, Lynch & Kramer

[57] ABSTRACT

Dyestuffs of the formula

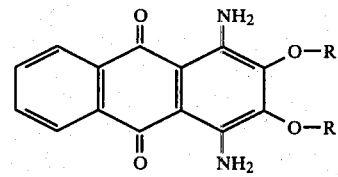

wherein R represents $C_1$–$C_5$-alkyl which is optionally substituted by fluorine, chlorine, hydroxyl or methoxy, are outstandingly suitable for printing polymeric materials in accordance with the transfer printing principle in that they produce intensely colored prints on these materials, especially on polyester and polyamide fibre materials.

10 Claims, No Drawings

TRANSFER PRINTING PROCESS AND PRINTING INKS AND TEMPORARY SUPPORTS FOR CARRYING OUT THIS PROCESS

The present invention relates to a process for printing sheet-like structures of synthetic or partially synthetic polymeric materials in accordance with the transfer printing principle, the process being characterised in that dyestuffs of the formula

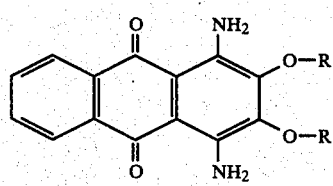

wherein R represents a straight-chain or branched alkyl radical which has 1 to 5 carbon atoms and can optionally be substituted by 1 to 3 fluorine or chlorine atoms or hydroxyl or methoxy groups, are used.

The invention furthermore relates to printing inks and printing pastes for transfer printing, the temporary supports printed or impregnated with these dyestuffs and the substrates which have been dyed with these dyestuffs in accordance with the transfer printing principle.

Examples of suitable radicals R are: methyl, ethyl, propyl, isopropyl, butyl, sec.-butyl, tert.-butyl, pentyl, 2-fluoroethyl, 2,2,2-trifluoroethyl, 3-chloro-propyl, 3-fluoro-propyl, 2-hydroxy-ethyl, 2-hydroxy-propyl, 3-hydroxy-propyl, 4-hydroxy-butyl, 2-methoxy-ethyl, 2-methoxy-propyl, 3-methoxy-propyl and 4-methoxy-butyl.

Dyestuffs which are preferably to be used are those of the formula I in which R represents methyl, ethyl, propyl or isopropyl.

The dyestuffs to be used according to the invention are in themselves known (compare German Reichspatent No. 538,014), or they can be prepared by the processes described therein.

The transfer printing process is also generally known (compare, for example, Colour Index, 3rd edition, Volume 2, page 2,480), and is described, in detail, for example, in French Patent Specifications Nos. 1,223,330, 1,334,829 and 1,585,119). In this process, so-called temporary supports onto which the dyestuffs have been applied or printed, for example in the form of so-called printing inks, such as have been described, for example, in French Patent Specification No. 1,573,698, or as pastes, are brought into close contact with the substrate to be printed, after which the dyestuff is transferred from the support to the substrate by the action of heat and, if appropriate, pressure.

Possible temporary supports are sheet-like structures such as paper, regenerated cellulose film, cotton fabric, linen fabric, metal foils and the like (compare British Patent Specification No. 1,190,889 and French Patent Specification No. 1,575,069). Paper is preferred.

The composition of the printing inks depends on the nature of the substrate, of the printing process and of the support material and on many other factors. In general, the inks consist of a dyestuff which can be sublimed, that is to say, in the present case, a dyestuff of the formula I, a binder, a solvent, if appropriate thickeners, if appropriate fillers and if appropriate dispersing agents.

Possible binders are, depending on the printing process, products which dye chemically and/or physically, such as are customarily used in textile printing or paper printing.

Possible solvents are suitable organic solvents or solvent mixtures. However, the printing inks and printing pastes can also be built up on an aqueous basis, that is to say they are dispersions of the dyestuffs in water, which also contains customary dispersing agents and thickeners (compare French Patent Specification No. 1,223,330 and U.S. Pat. No. 3,647,503).

Possible thickeners are, above all, those products which already cause a significant increase in viscosity when they are present in a low concentration.

Suitable dispersing agents are non-ionic compounds, such as alkyl polyglycol ethers and alkylphenol polyglycol ethers, and anionic compounds, such as napthalenesulphonic acid/formaldehyde condensates, ligninsulphonates and sulphite waste liquor products. The nature of the solvent is very greatly dependent on the nature of the printing process.

The printing inks can be used for printing in accordance with the customary printing processes (relief printing, gravure printing, offset printing, film printing or screen printing).

Gravure printing and rotary screen printing are particularly suitable printing processes for the preparation of printed paper temporary supports.

A gravure printing ink in general contains, in addition to the dyestuff which can be sublimed, a binder customary in gravure printing, that is to say natural or synthetic hard resins which dry physically, for example cellulose ethers, and an organic solvent which does not have too high a boiling point, such as ethanol or toluene.

In contrast, aqueous printing inks which contain, in addition to the dyestuff, a binder, a filler, a thickener and, if appropriate, organic solvents and/or dispersing agents are preferably used for rotary screen printing. Possible binders in this case are, above all, natural or synthetic products which dry physically and are water-soluble (or are rendered soluble by customary saponification processes), such as are customarily used for the preparation of flexographic printing inks and screen printing inks. Examples which may be mentioned are: shellac, and homopolymers and copolymers based on vinyl acetate, vinyl alcohol, vinyl chloride, acrylic acid, acrylic esters and/or maleic acid. Possible fillers are carbonates, sulphates, silicates, oxides and the like of the alkali metals and alkaline earth metals and of aluminium and titanium. Fine-particled naturally occurring calcium/magnesium carbonates (dolomite) have proved particularly suitable. Suitable thickeners are swellable clays, vegetable bean flour ethers and alginates. Solvents which can be used are water-miscible, physiologically acceptable solvents which have little odour and are relatively high-boiling, such as diacetone-alcohol, ethylglycol, diethylene glycol, glycerol and others, and mixtures of these solvents. Possible temporary supports in this case are, in particular, those of paper with a high absorbency (Cobb value $\leq 80$).

Substrates which are suitable for transfer printing with dyestuffs of the formula I are preferably sheet-like structures, such as fleeces, felts, furs, films and, above all, woven fabrics of synthetic or partially synthetic material, in particular those of aromatic polyesters, cellulose triacetate, high molecular weight polyamides and acrylonitrile polymers. Mixtures of these hydrophobic synthetic fibres with natural or regenerated fibres can also be used. Cellulose fibres which have been partially modified chemically (for example according to DT-OS (German Published Specification) No. 2,417,774) and cellulose materials which have been impregnated with crosslinking agents and pre-dried (for example according to DOS (German Published Specification) No. 2,502,590) are also suitable. Transfer printing onto polyester and cellulose triacetate is particularly preferred.

Clear, bluish-tinged red to ruby-coloured prints with good general fastness properties are obtained on these substrates by the process claimed.

A particular advantage of the process is that the dyestuffs to be used according to the invention dye the abovementioned types of fibres in strong shades which are almost solid.

EXAMPLE 1

(A) 75 g of the dyestuff of the formula

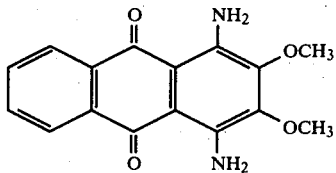

50 g of an anionic dispersing agent, for example a ligninsulphonate or a condensation product of napthalenesulphonic acid and formaldehyde, and 100 ml of water are mixed and the mixture is converted into a finely divided form by grinding in a ball mill for 10 hours.

(B) The aqueous dispersion obtained according to (A) can be processed to a printing paste as follows: 50–200 g are made into a paste with 400 g of a 10% strength carob bean flour ether thickener and 550–400 ml of water.

(C) Paper is printed with this printing paste by the gravure printing process. If this paper is pressed together with a textile of polyester fibres at 200° C. for 15–60 seconds, a strong, brilliant, bluish-tinged red print with good fastness properties is obtained. A similarly strong, brilliant bluish-tinged red print is also obtained on a textile of polyacrylonitrile under otherwise identical conditions.

EXAMPLE 2

(A) 45 g of the dyestuff of the formula indicated in Example 1 are made into a paste with 8 g of an emulsifier mixture of ethoxylated nonylphenyl (4–12 mols of ethylene oxide) in water. 10 g of Ethylcellulose N4 (Hercules Powder) and 35 g of a maleate resin which has been prepared by condensation of colophonium with maleic acid are added. The mixture is kneaded at 80°–100° C. for about 2 hours and then ground in one of the customary mills. A fine-particled dyestuff powder is obtained.

(B) 200 g of the dyestuff powder obtained according to (A) are added to a mixture of 730 g of ethanol, 50 g of ethylene glycol and 20 g of Ethylcellulose N22 (Hercules Powder), whilst stirring.

(C) Paper is printed with the resulting printing ink by the gravure printing process. Textiles of cellulose triacetate or polyamide, for example knitted fabrics, can be printed from these printed papers by the transfer process, and strong bluish-tinged red prints are obtained.

EXAMPLE 3

(A) 100 g of a dyestuff dispersion prepared according to the instructions of Example 1(A) are mixed intimately with 800 g of water and 100 g of a 5% strength alginate thickener. A fabric web of cotton is impregnated with this dyestuff solution on a padder and then dried.

(B) The cotton fabric obtained according to (A) is suitable for transfer printing, especially onto voluminous materials, such as, for example, carpets of polyester fibres.

EXAMPLE 4

(A) 75 g of the dyestuff of the formula indicated in Example 1 are finely dispersed together with 50 g of a condensation product of naphthalenesulphonic acid and formaldehyde and 100 g of water in a ball mill. The dyestuff dispersion thus obtained is stirred into a thickener consisting of 21 g of water, 7 g of diacetonealcohol, 41.3 g of Microdol ® extra (naturally occurring calcium/magnesium carbonate), 0.2 g of sodium hexametaphosphate, 0.5 g of a naphthalenesulphonic acid/formaldehyde condensation product, 8 g of 3% strength Bentone ® EW (swellable clay) and 12 g of Acrylate Binder DA (50% strength solution of the ammonium salt of a polyacrylate in 33% strength aqueous ethyl alcohol. The polyacrylate is a copolymer of 60% of acrylic acid ethyl ester, 25% of metacrylic acid ethyl ester and 15% of acrylic acid).

(B) This printing paste is printed onto a temporary support, preferably paper with a weight per square metre of about 60–80 g/cm$^2$ and a Cobb$_{60}$ value of about 80, using screen-printing stencils or rotary stencils.

Textiles of polyester, polyamide, polyacrylonitrile and cellulose triacetate can be printed with the paper thus prepared, by bringing the textile into contact with the paper for 15–60 seconds and heating the system to temperatures of 190°–200° C. Clear, bluish-tinged red prints are obtained on the types of fibre mentioned.

EXAMPLE 5

A print is produced on paper, fleece material or a cotton nettle using a printing paste as described in Example 2. If this print is pressed together with carpet material of polyester fibres at 200° C. for 30 seconds, a clear, bluish-tinged red print is obtained.

EXAMPLE 6

A printed paper as described in Example 4 is used and this is pressed together with blankets which have been produced from polyacrylonitrile material. This procedure is carried out in a chamber under a reduced pressure of between 70 and 200 mm Hg column. A print in which the dyestuff has penetrated deeply into the voluminous material is obtained.

EXAMPLE 7

Paper which has been prepared according to Example 2 is used and films which have been prepared from polyester, polyamide or polyacrylonitrile are printed with this paper. Transparent, bluish-tinged red prints are obtained.

EXAMPLE 8

If woven fabrics or fleeces coated with plastic are used instead of the films described in Example 7, strong, bluish-tinged red prints which have the property of running somewhat in the course of time are obtained.

EXAMPLE 9

Paper which has been prepared according to Example 4 is used, and objects which have been prepared from foams are printed with this paper. The foams can be prepared on the basis of polyester, polyether or polystyrene. A strong, bluish-tinged red print is again obtained.

EXAMPLE 10

A print is produced on paper, fleece material or a cotton nettle using a printing paste such as is described in Examples 1(B), 2(B) or 4. If this print is pressed together with carpet material (needle felt or tufted material) of polyamide 6 or 66 at 200° C. for 30 seconds, a brilliant, bluish-tinged red print which, in addition to having good fastness properties, is distinguished by the fact that the dyestuff has penetrated deeply into the textile material is obtained.

EXAMPLE 11

A woven fabric of polyester/cotton (50:50) is impregnated with a padding liquor consisting of 200 g of the reactive component described below, 30 g of N-methylol-ε-caprolactam, 60 g of hexamethylolmelamine hexamethyl ether, 5 g of ammonium sulphate and 705 g of water, and the fabric is squeezed off to a liquor pick-up of about 70% and dried at 100° C. for 3 minutes.

The goods thus prepared are brought into contact, at 210° C. for 120 seconds, with a transfer printing paper which is printed with the dyestuff of the formula indicated in Example 1.

A red-violet print with good fastness properties in use, in particular comparatively good fastness to wet processing and rubbing, is obtained.

The reactive component was prepared as follows: 283 g of stearic acid amide were mixed with 324 g of diethylene glycol monobutyl ether and the mixture is heated to 85° C., whilst stirring, and reacted with 125 g of formaldehyde solution (37% strength) for 15 minutes. The formaldehyde solution was first adjusted to a pH value of 8 with sodium carbonate. A solution of 40 g of sodium dodecylbenzenesulphonate in 628 g of water was added to the mixture and the resulting mixture was stirred until cold.

EXAMPLES 12-32

If the printing processes carried out in Examples 1-11 are carried out with one of the dyestuffs of the following table instead of with the dyestuff mentioned in Example 1, very similar, bluish-tinged red to ruby-coloured prints with good general fastness properties are obtained.

TABLE

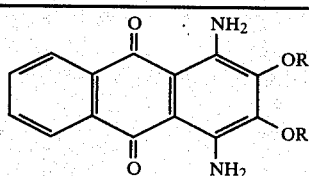

| Ex. No. | R | Colour shade of the print on polyester |
|---|---|---|
| 12 | —$C_2H_5$ | bluish-tinged red |
| 13 | —$(CH_2)_2$—$CH_3$ | bluish-tinged red |
| 14 | —$CH(CH_3)_2$ | red-violet |
| 15 | —$(CH_2)_3$—$CH_3$ | bluish-tinged red |
| 16 | —$CH(CH_3)$—$C_2H_5$ | red-violet |

TABLE-continued

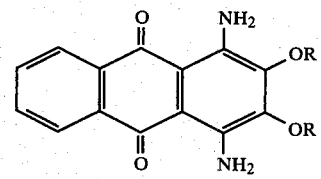

| Ex. No. | R | Colour shade of the print on polyester |
|---|---|---|
| 17 | —$CH_2$—$CH(CH_3)_2$ | bluish-tinged red |
| 18 | —$(CH_2)_4$—$CH_3$ | bluish-tinged red |
| 19 | —$(CH_2)_2$—$CH(CH_3)_2$ | bluish-tinged red |
| 20 | —$CH_2$—$C(CH_3)_3$ | bluish-tinged red |
| 21 | —$CH_2$—$CH_2$—F | bluish-tinged red |
| 22 | —$CH_2$—$CF_3$ | bluish-tinged red |
| 23 | —$(CH_2)_3$—Cl | bluish-tinged red |
| 24 | —$(CH_2)_3$—F | bluish-tinged red |
| 25 | —$(CH_2)_2$—OH | red-violet |
| 26 | —CH—CH(OH)—CH | red-violet |
| 27 | —$(CH_2)_3$—OH | bluish-tinged red |
| 28 | —$(CH_2)_4$—OH | bluish-tinged red |
| 29 | —$CH_2$—$CH_2$—$OCH_3$ | red-violet |
| 30 | —$CH_2$—$CH(CH_3)$—$OCH_3$ | bluish-tinged red |
| 31 | —$(CH_2)_2$—$OCH_3$ | bluish-tinged red |
| 32 | —$CH_2$—$CH(OCH_3)$—$CH_2$—$OCH_3$ | red-violet |

We claim:

1. Process for printing materials, preferably synthetic or partially synthetic polymeric materials, in accordance with the transfer printing principle, characterised in that dyestuffs of the formula wherein R represents a straight-chain or branched alkyl radical which has 1 to 5 carbon atoms and can optionally be substituted by 1 to 3 fluorine or chlorine atoms or hydroxyl or methoxy groups, are used.

2. Process according to claim 1, characterised in that dyestuffs of the formula indicated in which
R represents a straight-chain or branched alkyl radical which has 1 to 3 carbon atoms and can optionally be substituted by 1 to 3 flourine or chlorine atoms or by one hydroxyl or methoxy group, are used.

3. Process according to claim 1, characterised in that dyestuffs of the formula indicated in which
R represents a straight-chain or branched alkyl radical which has 1 to 3 carbon atoms and can optionally be substituted by 1 to 3 fluorine atoms, are used.

4. Process according to claim 1, characterised in that dyestuffs of the formula indicated in which
R represents methyl, ethyl, propyl or isopropyl, are used.

5. Process according to claim 1, characterised in that the dyestuff of the formula indicated in which
R represents ethyl, is used.

6. Process according to claim 1, characterised in that the dyestuff of the formula indicated in which
R represents methyl, is used.

7. Printing inks and printing pastes for transfer printing, characterised in that these contain dyestuffs of claim 1.

8. Temporary supports for transfer printing, characterised in that these are printed or impregnated with dyestuffs of claim 1.

9. Synthetic or partially synthetic polymeric materials, characterised in that these have been dyed or printed with dyestuffs of claim 1 in accordance with the transfer printing principle.

10. Polyester fibre materials, characterised in that these have been dyed or printed with dyestuffs of claim 1 in accordance with the transfer printing principle.

* * * * *

UNITED STATES PATENT AND TRADEMARK OFFICE
CERTIFICATE OF CORRECTION

PATENT NO. : 4,278,434
DATED : July 14, 1981
INVENTOR(S) : Friedrich W. Krück et al It is certified that error appears in the above-identified patent and that said Letters Patent are hereby corrected as shown below:

Column 4, line 31, "metacrylic" should be "methacrylic".

Column 6, Comp. 31: "$-(CH_2)_2-OCH_3$" should be "$-(CH_2)_4-OCH_3$".

Signed and Sealed this

Third Day of November 1981

[SEAL]

Attest:

GERALD J. MOSSINGHOFF

Attesting Officer     Commissioner of Patents and Trademarks